(12) United States Patent  
Olivieri

(10) Patent No.: US 6,996,175 B1  
(45) Date of Patent: Feb. 7, 2006

(54) MOTION VECTOR ESTIMATION

(75) Inventor: Stefano Olivieri, Teramo (IT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/455,662

(22) Filed: Dec. 7, 1999

(30) Foreign Application Priority Data

Dec. 7, 1998 (EP) .................................. 98204149  
May 18, 1999 (EP) .................................. 99201556

(51) Int. Cl.  
*H44B 1/66* (2006.01)

(52) U.S. Cl. ............................................. 375/240.16

(58) Field of Classification Search .......... 375/240.01, 375/240.02, 240.03, 240.11, 240.12, 240.13, 375/240.14, 240.15, 240.16; 382/107, 236, 382/238, 240; H04B 1/66  
See application file for complete search history.

(56) References Cited

U.S. PATENT DOCUMENTS

| | | | | |
|---|---|---|---|---|
| 4,853,775 A | | 8/1989 | Rouvrais et al. ............. 358/105 |
| 5,719,630 A | * | 2/1998 | Senda ..................... 375/240.17 |
| 5,818,969 A | * | 10/1998 | Astle ......................... 382/236 |
| 6,108,039 A | * | 8/2000 | Linzer et al. ............ 375/240.11 |
| 6,421,383 B2 | * | 7/2002 | Beattie ................... 375/240.05 |
| 6,483,928 B1 | * | 11/2002 | Bagni et al. ................. 382/107 |
| 6,498,815 B2 | * | 12/2002 | Kleihorst et al. ...... 375/240.02 |
| 2002/0025077 A1 | * | 2/2002 | De Haan et al. ............ 382/238 |

OTHER PUBLICATIONS

Paul Lippens et al, "A Video Signal Processor for Motion-Compensated Field-Rate Upconversion In Consumer Television", IEEE Journal of Solid-State Circuits, vol. 31, No. 11, Nov. 1996, pp. 1762-1769.

Haan De G et al: "An Efficient True-Motion Estimator Using Candidate Vectors From a Parametric Motion Model" IEEE Transactions on Circuits and Systems for Video Technology, US, IEEEE Inc. New york, vol. 8, No. 1, Feb. 1, 1998 (1998-02-01), pp. 85-91, XP00737028, ISSN: 1051-8251.

Her-Ming Jong et al: "Parallel Architectures For 3-Step Hierarchical Search Block-Matching Algorithm" IEEE Transactions on Circuits and Systems for Video Technology, US IEEE, Inc. New york, vol. 4, No. 4, Aug. 1, 1994 (1994-08-01), pp. 407-415, XP000464654, ISSN: 1051-8251.

* cited by examiner

*Primary Examiner*—Tung Vo

(57) ABSTRACT

In a method of recursive motion vector estimation, a plurality of candidate vectors is generated (E) from stored vectors (PV), one of these candidate vectors is selected (E) to generate a selected vector ($d^1$), a plurality of test vectors is generated (REF) from the selected vector ($d^1$), one of the test vectors is selected (REF) to generate an output vector ($d^2$), and the output vector ($d^2$) is stored (MEM).

12 Claims, 1 Drawing Sheet

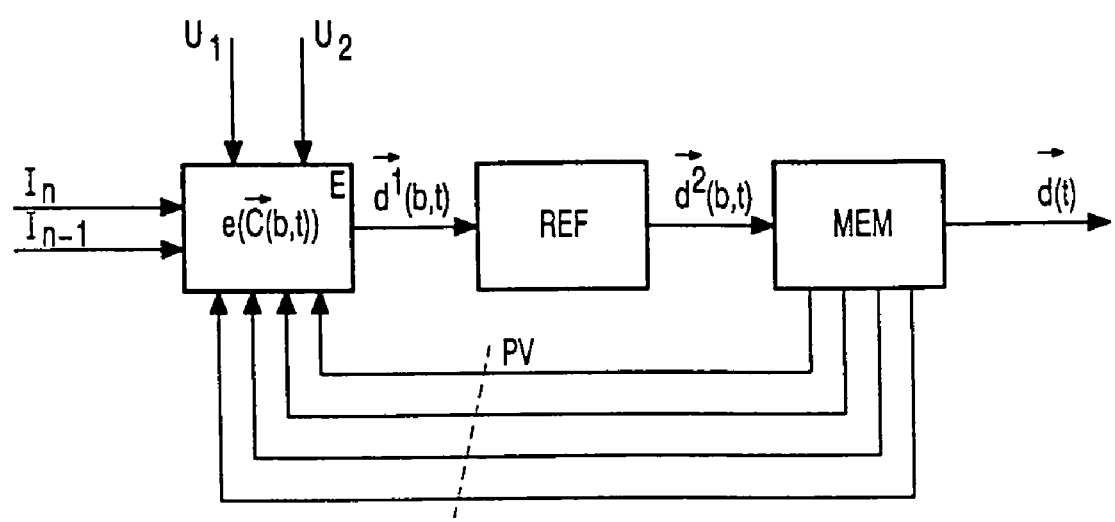

MOTION VECTOR ESTIMATION

The invention relates to a method and device for motion vector estimation.

The H.263 standard for low bit-rate video-conferencing [1]–[2] is based on a video compression procedure that exploits the high degree of spatial and temporal correlation in natural video sequences. The hybrid DPCM/DCT coding removes temporal redundancy using inter-frame motion compensation. The H.263 coding standard defines the techniques to be used and the syntax of the bit-stream. There are some degrees of freedom in the design of the encoder. The standard puts no constraints about important processing stages such as motion estimation, adaptive scalar quantization, and bit-rate control.

As far as the motion estimation part is concerned, block-matching motion estimation algorithms are usually adopted to estimate the motion field between the current frame to be coded and the previous decoded frame. The objective of motion field estimation for typical hybrid coding schemes is to achieve high motion-compensation performance; however, the evaluation of a large number of candidate vectors for each block can create a huge burden. To save computational effort, a clever search strategy can prevent that all possible vectors need to be checked.

In order to estimate the motion field related to the sequence to be coded, it is possible to use the 3-Dimensional Recursive Search block matching algorithm presented in [3] and [4]. Unlike the more expensive full-search block matchers that estimate all the possible displacements within a search area, this algorithm only investigates a very limited number of possible displacements. By carefully choosing the candidate vectors, a high performance can be achieved, approaching almost true motion, with a low complexity design.

The 3D-RS algorithm stimulates coherency of the vector field by employing recursion. However, in H.263 video coding context, the extremely smooth estimated motion field impairs the efficiency of the resulting displacement-compensated image prediction. Thus, a compromise must be found between minimizing the entropy of the displacement vectors and minimizing the displaced frame difference between temporally adjacent frames.

It is, inter alia, an object of the invention to provide an improved motion vector estimation. To this end, the invention provides a motion vector estimation method and device as defined in the independent claims. Advantageous embodiments are defined in the dependent claims.

In a method of recursive motion vector estimation according to the present invention, a plurality of candidate vectors is generated from stored vectors, one of these candidate vectors is selected to generate a selected vector, a plurality of test vectors is generated from the selected vector, one of the test vectors is selected to generate an output vector, and the output vector is stored.

These and other aspects of the invention will be apparent from and elucidated with reference to the embodiments described hereinafter.

The drawing shows a block diagram of an enhanced three-dimensional recursive search circuit in accordance with the present invention.

The invention proposes the design of an enhanced 3D-RS motion estimation algorithm that significantly improves the performance in terms of coding efficiency and leads to very good perceptual quality of the coded pictures, while keeping reasonably low the increase of the computational load.

The organization of the remainder of this document is as follows. First, the motion estimation part of the video codec is briefly summarized. Thereafter, the design of the 3D-RS motion estimation algorithm is introduced. Finally, the proposed Enhanced 3D-RS algorithm is described.

Encoding Strategy: Motion Estimation Techniques

Motion estimation is part of the inter-frame coding principle. Macro-blocks of the current frame are matched to the frame previously coded. In other words, for a specific position, possibly on slightly translated co-ordinates in the previous frame the best match is found. The underlying necessary translation giving this best match is referred to as the displacement vector. The difference image between the current block and the translated block in the previous frame is referred to as the motion compensated signal. This signal is forwarded to the coding part, in combination with the displacement vector.

In block-matching motion estimation algorithms, a displacement vector, or motion vector $\vec{d}(\vec{b}_c, t)$, is assigned to the center $\vec{b}_c = (x_c y_c)^{tr}$ of a block of pixels $B(\vec{b}_c)$ in the current image $I(\vec{x}, t)$, where tr means transpose. The assignment is done if $B(\vec{b}_c)$ matches a similar block within a search area $SA(\vec{b}_c)$, also centered at $\vec{b}_c$, but in the previous image $I(\vec{x}, t-T)$. The similar block has a center that is shifted with respect to $\vec{b}_c$, over the motion vector $\vec{d}(\vec{b}_c, t)$. To find $\vec{d}(\vec{b}_c, t)$, a number of candidate vectors $\vec{C}$ are evaluated applying an error measure $e(\vec{C}, \vec{b}_c, t)$ to quantify block similarity.

The pixels in the block $B(\vec{b}_c)$ have the following positions:

$$(x_c - X/2 \leq x \leq x_c + X/2)$$

$$(y_c - Y/2 \leq y \leq y_c + Y/2)$$

with X and Y the block width and block height respectively, and $\vec{x} = (x, y)^{tr}$ the spatial position in the image.

Although the cost function itself can be rather straightforward and simple to implement, the high repetition factor for this calculation creates a huge burden. This occurs if many candidate vectors axe evaluated, i.e. if large search areas are considered. To save computational effort in block-matching motion estimation algorithms, a clever search strategy has to be designed, preventing that all possible vectors need to be checked.

3-Dimensional Recursive Search

The 3-Dimensional Recursive Search block matching algorithm, presented in [3] and [4], only investigates a very limited number of possible displacements. By carefully choosing the candidate vectors, a high performance can be achieved, approaching almost true motion, with a low complexity design. Its attractiveness was earlier proven in an IC for SD-TV consumer applications [5].

The 3D-RS algorithm stimulates smoothness of the vector field by employing recursion. In this case the motion field $\vec{d}(t)$ is given by $$\vec{d}(t) \ni \vec{d}(\vec{b}_c,t) = \{\vec{C} \in CS(\vec{b}_c,t) | e(\vec{C},b_c,t) < e(\underline{V}, \vec{b}_c,t))\} \forall (\underline{V} \in CS(\vec{b}_c,t)),$$

$$CS^1(\vec{b}_c,t) = \begin{cases} \left(\vec{d}^2\left(\vec{b}_c - \begin{pmatrix}X\\Y\end{pmatrix}\right), t\right), \\ \left(\vec{d}^2\left(\vec{b}_c - \begin{pmatrix}-X\\Y\end{pmatrix}\right), t\right), \\ \left(\vec{d}\left(\vec{b}_c - \begin{pmatrix}0\\-2Y\end{pmatrix}\right), t-T\right), \\ \left(\vec{d}^2\left(\vec{b}_c - \begin{pmatrix}X\\0\end{pmatrix}\right), t\right) + \vec{U}_1, \\ \left(\vec{d}^2\left(\vec{b}_c - \begin{pmatrix}X\\0\end{pmatrix}\right), t\right) + \vec{U}_2 \end{cases} \quad (1)$$

$U_{1x,y}$=random($-a_1, \ldots, a_1$), $U_{2x,y}$=random ($-a_2, \ldots, a_2$)

where random ($-a, \ldots, a$) denotes a random choice from the range $[-a, a]$.

The candidate set $CS(\vec{b}_c,t)$ consists of 5 vectors:
three predictor vectors from a spatio-temporal neighborhood: two from directly adjacent blocks in the same field at the upper-left and upper-right corners of the present block, and one block from a previous field, not directly adjacent and located below and to the right of the present block, and
two vectors obtained by adding a random update vector to the motion vector estimated for the previous block, i.e. the left neighbor.

This implicitly assumes spatial and/or temporal consistency. It is possible to use a half-pixel accuracy 3-D Recursive Search block-matcher is proposed, where $[-a_1, a_1]=[-1, 1]$ and $[-a_2, a_2]=[-6, 6]$.

The 3D-RS algorithm leads to very smooth vector fields. This fact reflects its improved coherency strategy (recursive search with spatial and temporal candidates). However, low bit-rate H.263 video coding leads to quite poor video quality. Moreover, dealing with CIF or QCIF formats, the number of 16×16 blocks is relatively small and that causes a slower convergence of the algorithm; these constraints seem to be too strong under certain circumstances, and that makes fall the motion estimator in local minimum errors.

If its low computational load (only five displacements are checked) is taken into account, the 3D-RS algorithm is an efficient motion estimator. [6] shows a comparison with the full-search motion estimator; for good quality images in the range of 32 to 37 dB PSNR, the average P-frame bit-rate increases with only some 5% to achieve the same PSNR. However, in H.263 video coding context the performance of the 3D-RS algorithm is less satisfactory.

The Enhanced 3D-RS Motion Estimation Algorithm

The recursive strategy of the 3D-RS algorithm stimulates the smoothness of the motion field; this is an advantage because the more the smoothness is, the less the bits spent for motion data are (due to the entropy encoding of the motion information). However, the strong recursion of the 3D-RS algorithm may lead to local minimum errors, which impairs the efficiency of the resulting displacement-compensated image prediction. Anyway, we can regard the 3D-RS algorithm as a very efficient coarse motion estimator, whose estimated motion field needs refining.

To this end, the spatial recursion of the algorithm is exploited; if a one-pixel search window refinement around each motion vector at macro-block level is performed, the correction on the currently estimated motion vector is immediately forwarded to the estimation of the next displacement vector.

This solution is shown in FIG. 1. A current image $I_n$ and a previous image $I_{n-1}$, random update vectors U1 and U2, and prediction vectors PV from a motion field memory MEM are applied to an estimation circuit E for generating the best vector $d^1(b,t)$ in the manner described above with regard to the 3D-RS algorithm. The integer pixel refinement block REF, inserted into the recursive loop of the estimator, enhances the convergence and speeds up the recursion of the algorithm. It processes the vector $d^1(b,t)$ from the estimation circuit E to obtain a vector $d^2(b,t)$. The vector $d^2(b,t)$ is stored in the motion field memory MEM that outputs the output vector d(t). On formulas, the motion field $\vec{d}(t) \ni \vec{d}(\vec{b}_c,t) = \vec{d}^2(\vec{b}_c,t)$ is found as $$\vec{d}^s(\vec{b}_c, t) = \{\vec{C} \in CS^s(\vec{b}_c,t) | e(\vec{C},\vec{b}_c,t) < e(\underline{V},\vec{b}_c,t))\}$$

$$\forall (\underline{V} \in CS^s(\vec{b}_c,t)), s = 1, 2$$

$$CS^1(\vec{b}_c,t) = \begin{cases} \left(\vec{d}^2\left(\vec{b}_c - \begin{pmatrix}X\\Y\end{pmatrix}\right), t\right), \\ \left(\vec{d}^2\left(\vec{b}_c - \begin{pmatrix}-X\\Y\end{pmatrix}\right), t\right), \\ \left(\vec{d}\left(\vec{b}_c - \begin{pmatrix}0\\-2Y\end{pmatrix}\right), t-T\right), \\ \left(\vec{d}^2\left(\vec{b}_c - \begin{pmatrix}X\\0\end{pmatrix}\right), t\right), \\ \left(\vec{d}^2\left(\vec{b}_c - \begin{pmatrix}X\\0\end{pmatrix}\right), t\right) + \vec{U} \end{cases}$$

$$\vec{U} = (\alpha_x \alpha_y)\begin{pmatrix}R_x\\R_y\end{pmatrix}, \vec{R} = \left[\vec{d}^2\left(\vec{b}_c - \begin{pmatrix}X\\0\end{pmatrix}\right), t\right) - \vec{d}^1\left(\vec{b}_c - \begin{pmatrix}X\\0\end{pmatrix}\right), t\right)\right]$$

$$CS^2(\vec{b}_c, t) = \{\vec{C} | \vec{C} = \vec{d}^1(\vec{b}_c,t)\vec{R}\}, R_{x,y} = \{0, +1, -1\}$$

Herein, the superscript s refers to the step s=1 ... N in the computation of the motion field.

Equation (2) also shows that a different updating strategy suitable for enhanced estimation can be adopted. No random updates are added to the spatial predictor; this can be explained by the fact that the refinement process improves the accuracy of the motion estimate. Therefore, the displacement vector calculated for the previous block is supposed to be a more reliable predictor to ensure convergence to accurate motion field. In order to enable quick convergence, the update vector U is achieved multiplying 'R by the updating step a, where 'R is the refinement term related to the previously computed motion vector; in this way the updating process adapts to the local minimum direction. Experimental results proved that the proposed updating strategy leads to some performance improvement with respect to random strategy.

The total number of candidate vectors is 13. Note that, unlike iterative estimation, no additional delay is introduced; indeed, the displacement vectors are immediately available after processing each block.

This invention is not concerned with determining sets of candidate vectors. From a lot of experiments on candidate vectors, it followed that, as far as H.263 video coding is concerned, one can hardly achieve better performance by simply modifying the set of candidate vectors of the 3D-RS algorithm.

Therefore, it is not proposed to use a particular set of candidate vectors. Any set of any version of the 3D-RS algorithm that can be found in the literature can be used. Also, the candidate vectors of spatially neighboring blocks can be used as candidate vectors, according to EP 0,415,491.

One of the important aspects of this invention is as follows. Since the 3D-RS algorithm for H.263 video coding provides quite inaccurate motion vectors, the purpose of the enhancement module is to improve the accuracy of the estimated motion field; thus, the enhancement can be regarded as a post processor of motion vectors. As the enhancement is a post-processing module, it is not involved in determining the set of candidate vectors, as it processes the motion vector associated with the present block, once the best displacement has been selected out of the candidate vectors. Usually, post-processing is done once the whole motion field has been computed.

A new aspect of the enhancement of this invention is that better results can be achieved by doing post processing inside the recursion loop of the motion estimation algorithm, provided that the motion field is computed by a recursive motion estimation algorithm. This means that once the motion vector V0 has been selected out of the candidate vectors, said motion vector V0 is refined to produce the motion vector V1, in that if the frame difference corresponding to V1 is smaller than the frame difference associated with V0, V1 immediately replaces V0 before the new set of candidate vectors for the next block is generated.

Note that this technique may be used for any recursive motion estimation algorithm; it can be also used for the motion estimation algorithm described in U.S. Pat. No. 4,853,775.

The post processing of a preferred embodiment of this invention includes an integer pixel refinement around the motion vector that has been selected by the motion estimator; however, any refinement technique able to achieve more accurate motion field may be used. Very good results can be obtained if within the recursion loop, the integer pixel refinement is followed by a half pixel refinement; this solution results, however, in a relatively large computational load, so that the integer pixel refinement is preferred.

The new and important aspect is that, provided that post processing is done inside the recursion loop of any recursive motion estimation algorithm instead of outside the recursion loop, the convergence of the recursive motion estimation algorithm is speeded up.

Another important aspect of a preferred embodiment of this invention is that the difference between the output and the input of the enhancement module gives a local information on the trend of the motion (see Equation 2). This information can be exploited to determine an additional candidate vector which contributes to further improve the performance of the algorithm (see also attached block diagram). This can be regarded as an optional feature of the proposed scheme, meaning that the enhancement provides itself conspicuous performance gain, even if the above defined additional candidate vector is not added to the original candidate set.

It is noted that both simulation results and subjective tests have confirmed the effectiveness of the enhancement; a lot of time have been spent finding an efficient technique to improve the performance of the 3D-RS algorithm, which provides poor rate-distortion performance when used for H.263 video coding purpose. Although many optimization steps were done to tune various parameters of the 3D-RS algorithm and various techniques to refine the motion field estimated by the 3D-RS algorithm were evaluated, only the adoption of the enhancement scheme described above resulted in considerable performance gain.

The Enhanced 3D-RS motion estimation algorithm for H.263 video coding application provides a satisfactory performance in terms of coding efficiency while keeping low the computational load. The Enhanced 3D-RS algorithm outperforms the improved iterative 3D-RS strategy, and in case of typical video-conferencing sequences it is very close to full-search motion estimation. Furthermore, the recursive estimation strategy stimulates better consistency of the motion field and leads to improved noise robustness of the motion estimation process, in that the Enhanced 3D-RS is comparable with full-search in case of noisy sequences.

The Enhanced 3D-RS algorithm has been successfully integrated with the H.263 video codec for the Philips Trimedia processor (TM1000). It has been seen that this motion estimation algorithm leads to significant computational saving, and real-time experiments have proved very good perceptual quality of the coded sequences.

The drawing shows a block diagram of an enhanced three-dimensional recursive search circuit in accordance with the present invention. Images $I_n$ and $I_{n-1}$ are applied to a motion estimator E, to which also a plurality of prediction vectors PV from a memory MEM and two update vectors U1 and U2 are applied. A selected output vector $d^1(b,t)$ of the estimator E is applied to a refinement circuit REF that furnishes an output vector $d^2(b, t)$ to the memory MEM that furnishes the output vector $d(t)$.

The invention thus discloses a method and an apparatus of improving the accuracy of the motion field estimated by a motion estimation algorithm, which allows improved convergence of the motion estimation algorithm with respect to conventional methods, provided that the motion field is estimated by a recursive motion estimation algorithm. The word recursive means that the motion estimation algorithm computes the motion vector associated with a picture portion (for example a block) by exploiting motion information already determined for previous blocks.

Preferably, eight motion vectors are generated from the motion vector V0 that has been selected out of the corresponding candidate vector set. This apparatus is called enhancement module.

Preferably, each of the eight vectors is achieved by adding ±1 pixel displacement to each component of the motion vector V0 that has been selected out of the candidate vector set. The motion vector V1 out of said eight motion vectors with the smallest frame difference is selected. If the frame difference of said motion vector V1 is smaller than the frame difference of the motion vector V0, the motion vector V1 immediately replaces the motion vector V0 before the new set of candidate vectors for the motion vector associated with the next block is generated.

Preferably, a local information is provided on the trend of the motion by computing an update vector given by the difference between output and input of the enhancement.

This update vector can be used to generate one more candidate vector by adding the update vector to one of the vectors of the candidate vector set.

Advantageously, the convergence of the 3D-RS motion estimation algorithm is speeded up to obtain a more accurate motion field. Advantageously, the method allows substantial rate-distortion performance gain when applied to H.263 video coding, as well as improved subjective quality.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of other elements or steps than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware.

REFERENCES

[1] ITU-T DRAFT Recommendation H.263, Video coding for low bit-rate communication, 2 May 1996.
[2] K. Rijkse, "ITU standardisation of very low bit-rate video coding algorithms", *Signal Processing*: Image Communication 7 (1995) pp. 553–565.
[3] G. de Haan, P. W. A. C. Biezen, H. Huijgen, O. A. Ojo, "True motion estimation with 3-D recursive search block matching", *IEEE Trans. Circuits and Systems for Video Technology*, Vol. 3, October 1993, pp. 368–379.
[4] G. de Haan, P. W. A. C. Biezen, "Sub-pixel motion estimation with 3-D recursive search block-matching", *Signal Processing: Image Communication* 6 (1995), pp. 485–498.
[5] P. Lippens, B. De Loore, G. de Haan, P. Eeckhout, H. Huijgen, A. Loning, B. McSweeney, M. Verstraelen, B. Pham, J. Kettenis, "A video signal processor for motion-compensated field-rate upconversion in consumer television", *IEEE Journal of Solid-state Circuits*, Vol. 31, no. 11, November 1996, pp. 1762–1769.
[6] W. Bruls, A. van der Werf, R. Kleihorst, T. Friedrich, E. Salomons, F. Jorritsma, "A single-chip MPEG2 encoder for consumer video storage applications", ICCE 97, 1997.

What is claimed is:

1. A recursive motion vector estimation method, comprising the steps of:
   a) for a current block of a picture divided into a plurality of blocks, and based on motion information generated for the previously-processed block if any and if immediately to the left of said current block, the blocks being processed by said method in a predetermined order, generating (E) a plurality of candidate vectors from stored vectors (PV);
   b) selecting (E) one of these candidate vectors to generate a selected vector ($d^1$);
   c) generating (REF) a plurality of test vectors from the selected vector ($d^1$);
   d) selecting (REF) one of the test vectors to generate an output vector ($d^2$);
   e) storing (MEM) the output vector ($d^2$); and
   f) re-executing steps a) through f) for a next-to-be-processed block, if any, as said current block.

2. A recursive motion vector estimation method, comprising:
   generating (E), for a block, a plurality of candidate vectors from stored vectors (PV);
   selecting (E) one of these candidate vectors to generate a selected vector ($d^1$);
   generating (REF) a plurality of test vectors from the selected vector ($d^1$);
   selecting (REF) one of the test vectors to generate an output vector ($d^2$); and
   storing (MEM) the output vector ($d^2$) as one of said stored vectors for possible use in said generating for a next block.

3. A device for recursive motion vector estimation, the device comprising:
   a) for a current block of a picture divided into a plurality of blocks, and based on motion information generated for the previously-processed block if any and if immediately to the left of said current block, the blocks being processed by said method in a predetermined order, means (E) for generating a plurality of candidate vectors from stored vectors;
   b) means (E) for selecting one of these candidate vectors to generate a selected vector ($d^1$);
   c) means (REF) for generating a plurality of test vectors from the selected vector ($d^1$);
   d) means (REF) for selecting one of the test vectors to generate an output vector ($d^2$);
   e) means (MEM) for storing the output vector ($d^2$); and
   f) re-executing steps a) through f) for a next-to-be-processed block, if any, as said current block.

4. The method of claim 2, wherein said generating a plurality of test vectors from the selected vector ($d^1$) includes adding −1, 0, or +1 to each component of the selected vector ($d^1$).

5. The method of claim 2, wherein each of said block and said next block is one of the plural blocks of a picture divided into a plurality of blocks.

6. The method of claim 2, a vector of said plurality of candidate vectors generated in the recursive method is generated based on a difference between said output vector and said selected vector.

7. The method of claim 6, wherein the generating of said vector of said plurality comprises adding said difference to another vector of said plurality of candidate vectors.

8. A device for recursive motion vector estimation, the device comprising:
   means for generating (E), for a block, a plurality of candidate vectors from stored vectors (PV);
   means for selecting (E) one of these candidate vectors to generate a selected vector (d);
   means for generating (REF) a plurality of test vectors from the selected vector ($d^1$);
   means for selecting (REF) one of the test vectors to generate an output vector ($d^2$); and means for storing (MEM) the output vector ($d^2$) as one of said stored vectors for possible use in said generating for a next block.

9. The device of claim 8, wherein said generating a plurality of test vectors from the selected vector ($d_1$) includes adding −1, 0, or +1 to each component of the selected vector ($d^1$).

10. The device of claim 8, wherein each of said block and said next block is one of the plural blocks of a picture divided into a plurality of blocks.

11. The device of claim 8, wherein a vector of said plurality of candidate vectors generated in the recursive estimation is generated based on a difference between said output vector and said selected vector.

12. The device of claim 8, wherein the generating of said vector of said plurality comprises adding said difference to another vector of said plurality of candidate vectors.

* * * * *